Nov. 17, 1953   G. A. DU ROCHER   2,659,838
DIRECTIONAL SIGNAL SYSTEM FOR VEHICLES
Filed March 3, 1951
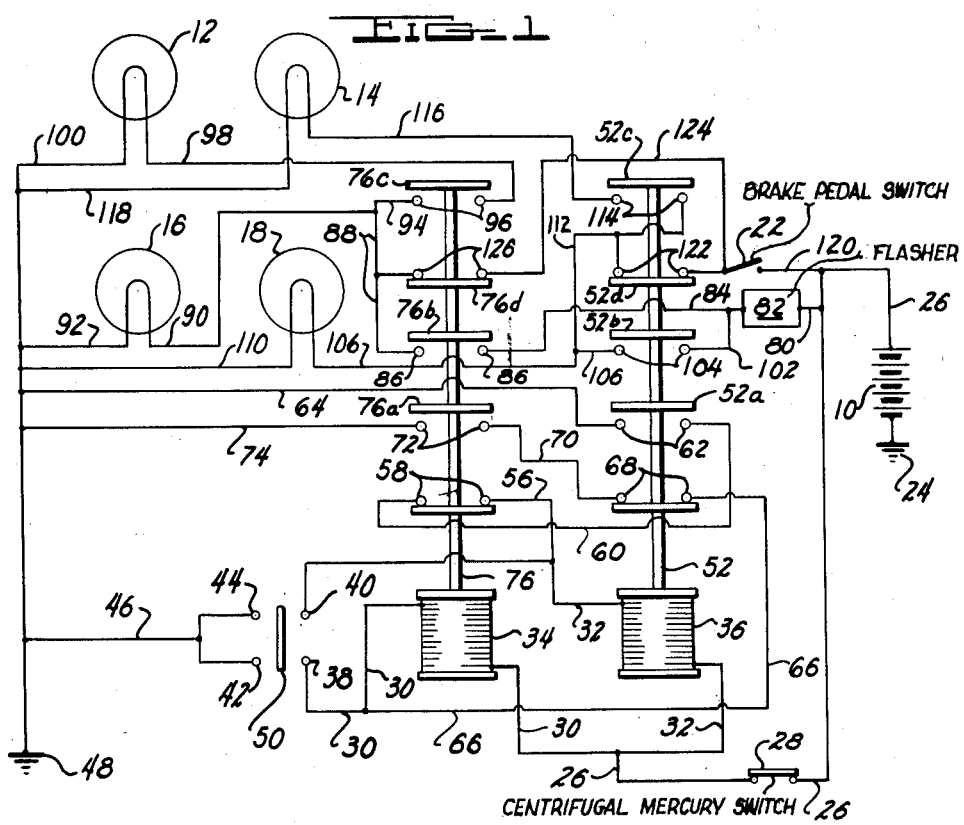
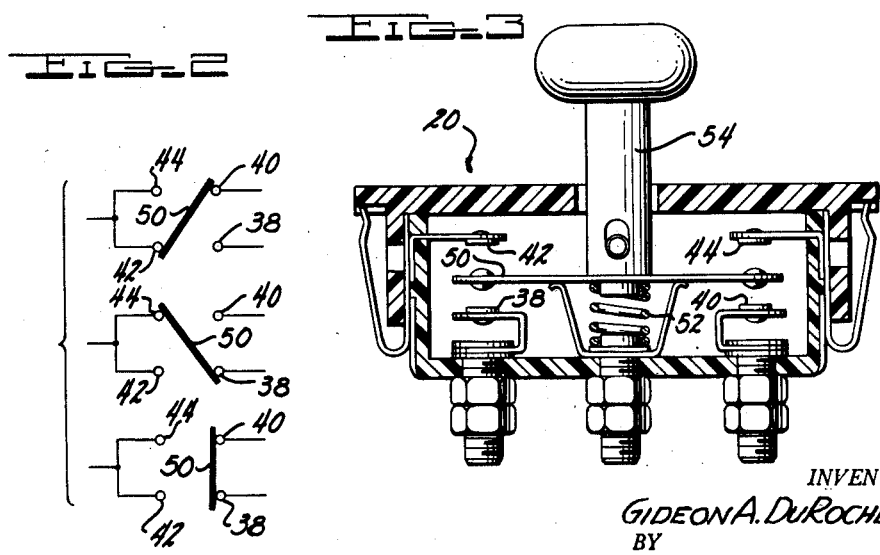
INVENTOR.
GIDEON A. DUROCHER
BY
Arthur M. Smith
ATTORNEY Patented Nov. 17, 1953

2,659,838

UNITED STATES PATENT OFFICE 2,659,838

DIRECTIONAL SIGNAL SYSTEM FOR VEHICLES

Gideon A. Du Rocher, Grosse Pointe Farms, Mich., assignor to Essex Wire Corporation, Detroit, Mich., a corporation of Michigan Application March 3, 1951, Serial No. 213,762

5 Claims. (Cl. 315—77)

This invention relates to vehicle turn indicating signals and more particularly to an improved directional signal system for energizing turn signal lamps and for automatically or manually de-energizing same after a turn has been completed.

At the present time, the directional signal systems commonly in use have automatic mechanical means for cancelling the turn signal after the vehicle has completed its turn. These mechanical means are operatively connected to the steering mechanism of the vehicle by cam means or the like, so that after the vehicle has entered the turn and the driver begins to straighten the wheels, the cam means or the like will engage a suitable mechanism to cause the circuit including the turn indicating lamps to be opened thereby cancelling the turn signal.

This mechanical type of cancelling is not entirely satisfactory because of the ever present danger that the mechanical means will become defective and bind or lock the steering mechanism so that the driver loses control of the car. Further, this mechanical type of cancelling does not have universal application since most of the various makes of automobiles have different steering post constructions, thereby requiring a specially built modification of cancelling means for each make of car.

Various types of directional signal systems have been developed which have electrical cancelling means and which partially or wholly have overcome the above objections to the mechanical cancelling means. However, such electrical cancelling means for reasons of faulty operation, economy, or otherwise, have not been universally adopted.

It is an object of the present invention to provide a directional signal system for a vehicle which system is constructed and arranged to permit ready installation in any of the various makes of new or used cars, and which have electrically operated control means which are operated independently of the steering mechanism of the vehicle.

It is another object of the present invention to provide a directional signal system in which the control means include a manually operable switch, closable in three ways, either to actuate the right or left turn indicating lamps or to manually cancel such signals from either of said lamps, said switch being a relatively small compact unit adapted to be mounted in the vehicle at any location suitable for use by the operator, thereby permitting its ready installation into any of the various makes of automobiles.

It is still another object of the present invention to provide a directional signal system of the foregoing character which includes a locking arrangement which will require the driver merely to close the switch to actuate the proper turn indicating lamp and thereafter the lamp will continue to intermittently light until manually cancelled by the driver or automatically cancelled by a centrifugally operated cancelling means, the latter being so positioned in the system that it can be optionally eliminated if desired without changing the remainder of the system and thereby to provide an entirely manually operated system.

It is still another object of the present invention to provide a directional signal system of the foregoing character in which the turn indicating lamps perform the dual purpose of signalling turns as well as stops and in which the turn indicating characteristics of the system predominate so that when the brakes of the vehicle are applied, while one directional lamp is in operation indicating a turn, said lamp will continue to intermittently light while the other directional lamp will be lighted to indicate the stopping action of the vehicle.

Other objects of this invention will appear in the following description and appended claims, reference being had to the accompanying drawings forming a part of this specification wherein like reference characters designate corresponding parts in the several views.

In the drawings:

Fig. 1 is a schematic wiring diagram of the directional signal system of the present invention;

Fig. 2 is a schematic showing of the three ways the main control switch shown in Fig. 1 can be closed; and Fig. 3 is a sectional view of the main control switch used in the present directional signal system.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, and particularly to Fig. 1, a schematic wiring diagram of the directional signal system for motor vehicles can be seen. The storage battery 10 of the vehicle (not shown) constitutes the source of current supply for the system, and at 12 and 14 are shown respectively, the left and right front turn indicating lamps of the vehicle. The left and right rear turn indicating lamps are shown respectively at 16 and 18, and these lamps also are adapted to be used as the stop signalling lamps of said vehicle.

The means for controlling operation of the system comprises the main control switch 20, one embodiment of which is shown in detail in Fig. 3, which normally will be mounted in the vehicle on its steering post (not shown) or adjacent thereto so as to be within easy reach of the driver. Another switch 22 is provided which is normally opened and which is closed when the foot brake pedal (not shown) of the vehicle is depressed by the driver.

As will be explained hereinafter, the system comprises broadly a turn indicating signal circuit and a control circuit therefor. The control circuit includes the battery 10, grounded at one of its terminals, as at 24, and having the conductor 26 connected to its other terminal. The conductor 26 extends from said other battery terminal to a conventional type of normally closed mercury switch 28 and then is divided into the parallel conductors 30 and 32 which lead respectively through the left relay coil 34 and the right relay coil 36 to the contacts 38 and 40 of control switch 20.

The control switch 20 also includes the contacts 42 and 44 which are suitably grounded by the conductor 46 as at 48. A switch element 50 is spring mounted by a suitable coil spring 52, Fig. 3, to permit said switch element 50 to close selectively a circuit across the contacts 40 and 42, the contacts 38 and 44, or directly across the contacts 38 and 40. These three positions of the switch element 50 are shown schematically in Fig. 2 of the drawing. As is believed readily understood, if the switch element 50 is moved to the position shown in Fig. 2 bridging the contacts 40 and 42, a circuit will be completed through the right relay coil 36 thereby energizing the same to actuate the relay element 52. This in turn causes the relay element 52 to open the normally closed contacts and to close the normally open contacts of the turn indicating signal circuit for the right front and right rear signal lamps 14 and 18.

As can be seen in Fig. 3, the control switch 20 is a momentary type of switch which permits the driver to momentarily close the desired circuit by moving the pivotally mounted switch arm 54 to the necessary position, and when the driver releases the same, the spring 52 will return the switch arm 54 and the switch element 50 to their normal positions shown in Fig. 3. Since it is desired that the turn indicating signal continue operating until the turn of the vehicle has been completed or until the driver wishes to manually cancel the same, a lock-in device has been provided which will permit the signal to continue operating after the driver has released the switch arm 54. The right relay coil 36 remains energized after the switch arm 54 has been released by the driver, by means of the circuit established through the conductor 56, normally closed contacts 58, conductor 60, normally opened contacts 62, and conductor 64 which leads to the ground 48. As can be seen, the conductor 56 is joined to the conductor 32 which leads through the right relay coil 36 so that when the coil 36 has been initially energized, the relay element 52 will cause the contact element 52A to bridge the contacts 62, thereby closing the circuit through these contacts, and when the operator releases switch arm 54, current will continue to flow through right relay coil 36 so that the normally open contacts controlled by this relay coil will remain closed and the normally closed contacts controlled by this relay coil will remain opened.

A similar lock-in means is provided for the left relay coil 34, and this includes the conductor 66, the normally closed contacts 68, the conductor 70, the normally open contacts 72, and the conductor 74 which leads to the ground 48. This last named relay lock-in means operates the same as the relay lock-in means for the right turn indicating lights so that when the coil 34 is energized, the relay element 76 will move to close the normally open contacts and to open the normally closed contacts. When the left relay coil 34 has been energized, the contact element 76A will bridge the normally open contacts 72 to permit current to continue to flow through the left relay coil 34 and thereby to lock the normally open contacts in a closed position and normally closed contacts in an open position after the driver has released the switch arm 54.

From the above description it is believed clear that it is impossible for both the right turn and left turn indicator signals to be operating simultaneously as such, because in order for both the left relay coil 34 and the right relay coil 36 to be energized, it would be necessary that both the normally closed contacts 68 or 58 be closed, but this is not possible because if either of the coils 34 or 36 is energized, its normally closed contacts will be open.

The lock-in means described above also operate to permit the operator to manually cancel either a right or a left turn indicating signal merely by depressing the switch arm 54 so that the switch element 50 bridges the contacts 38 and 40. As is believed readily understood, when this is done the potential on the right relay coil 34 and left relay coil 36 is equalized, because a circuit is then closed through each of the conductors 30 and 32. Since the potential on the two relays is equalized the relay element 52 or the relay element 76 will return to its normal position causing the contacts 72 or 62 to be opened thereby discontinuing the flow of current through whichever of relay coils 34 or 36 was energized.

This manual cancelling feature of the present invention is important since it permits the mercury cancelling switch 28 to be eliminated entirely from the system if desired. As can be seen from examining the schematic diagram shown in Fig. 1 of the drawing, eliminating the mercury switch 28 will in no way affect the remaining portions of the turn indicating signal system. It is desirable to have a turn indicating signal system in which the cancelling of a turn signal is carried out manually and which does not include automatic cancelling. It is found that the automatic cancelling means now in use, whether mechanical or electrical, do not always cancel the signal after the indicated turn has been completed. When this happens, the vehicle continues on its course indicating that a turn is to be made when actually no such turn is contemplated. This frequently constitutes a traffic hazard, and it is believed such traffic hazards will be minimized if the driver is not in a position to rely upon an automatic cancelling means to cancel the turn signal, but instead is required to manually cancel the signal. However, the present turn indicating signal system is suitably designed to include an automatic cancelling means if desired, and the automatic cancelling means can be introduced into the system without any change thereof. It should be understood also, that it is contemplated using any other type of automatic centrifugal cancelling means such as pendulum switches or the like in place of the mercury cancelling switch.

Reference is now made to Fig. 1 of the drawing for an explanation of the turn indicating signal circuit of the present system. The source of current supply is the storage battery 10, and when either the left or right turn indicating signals is in operation, current will be supplied through the conductor 26 to the conductor 80 and from there through the conventional flasher means 82. The left turn indicating lamps will receive electric current through the conductor 84, normally open contacts 86, conductor 88 and conductor 90. The conductor 92 leading from the left rear indicating lamp 16 is suitably grounded at 48. The front left turn indicating lamp 12 is connected to the conductor 88 by the conductor 94, normally open contacts 96 and conductor 98. The left front turn indicating lamp 12 is suitably grounded by the conductor 100 at 48.

Thus it can be seen that when the operator of the vehicle actuates the switch arm 54 prior to making a left turn, he will close a circuit across the contacts 38 and 44 of the control switch 20 which will result in the left relay coil 34 being energized thereby closing the normally open contacts 86 and 96 by means of these contacts being bridged respectively by the contact elements 76B and 76C. This in turn results in current flowing from the battery to the flasher means 82 to each of the turn indicating lamps 12 and 16.

Similarly, the right turn indicating lamp will receive a flow of current when the normally open contacts controlled by the right relay coil 36 are closed. The right rear lamp 18 will receive a flow of current from the battery 10 through the conductors 26 and 80 to the flasher 82. The current to the rear right turn indicating lamp 18 will then flow through the conductors 84 and 102 to the normally open contacts 104, which will be bridged by the contact element 52B, and from there through the conductor 106 to the rear right turn indicating lamp 18. The said lamp 18 is suitably grounded by the conductor 110.

The front right turn indicating lamp 14 receives its flow of current through the conductor 112 which is connected to the conductor 106 and through the normally open contacts 114, which are then bridged by the contact element 52C, and the conductor 116. This lamp 14 is suitably grounded through the conductor 118. Thus it can be seen that when the right relay coil 36 is energized, current will flow through the flasher 82 to each of the right turn indicating lamps 14 and 18 to provide intermittent flashing of said lamps.

In the present directional signal system, the rear right turn indicating lamp 18 and the rear left turn indicating lamp 16 are also used as conventional stop signalling lamps. The present system is suitably designed so that when one or the other of these lamps is in operation indicating a turn is to be made, its use in this capacity will not be interrupted if the driver applies his brakes so that the lamp normally would light to indicate a stop. However, the other lamp which is not in use for indicating a turn will signal the stop. If neither of these rear lamps 16 and 18 are in use indicating a turn is to be made, the rear right turn indicating lamp 18 will receive a flow of current from the storage battery 10 through the conductor 26 and conductor 120, through the manually operated brake pedal switch 22, through the normally closed contacts 122, and through conductors 112 and 106. The circuit for the rear left turn indicating lamp 16 is similar and leads from the switch 22 through the conductor 124 and through the normally closed contacts 126, and from there through the conductors 88 and 90.

It is believed readily apparent that if either the left relay coil 34 or the right relay coil 36 is energized so that the contact elements 76D or 52D respectively are open, the rear lamps 16 or 18 respectively will only receive an intermittent interrupting flow of current through the flasher 82 so that such lamp will operate to indicate a turn.

It is believed clear from the above description that a directional signal system has been provided which is constructed and arranged to permit its ready installation into any of the various makes of new or used cars now on the market. The control switch 20 can be easily mounted on or adjacent to the steering post of the vehicle to be within easy reach of the driver, and no particular construction of the steering post is required for mounting this switch. Also, it is a small, compact unit which is simply constructed so that only two wire conductors are necessary to extend up the steering post to the control switch. These are the conductors 30 and 32 which extend through the relay coils 34 and 36 to control the turn indicating signal circuit, and said relay coils may be located in any desirable position in the car away from the steering post.

Further, this turn indicating signal system includes a simple lock-in arrangement so that the control switch 20 may be the momentary type which permits the operator to release the switch handle immediately after actuating it to indicate the desired turn. The system also provides a simple arrangement for manually cancelling a turn signal and permits use of an automatic cancelling switch if desired or permits elimination of the latter if desired without rearranging any other portion of the system.

The system is also arranged so that the rear turn indicating lamps can be used for indicating a turn is to be made, and the system also permits use of the turn signalling lamps as stop signalling lamps thus reducing the cost of installing this system on either new or used cars.

Having thus described my invention, I claim:

1. A directional signal system for vehicles comprising right and left turn indicating signal lamps, a source of current supply for each of said signal lamps, normally open contacts which when closed will establish a signal circuit through said right turn indicating signal lamp, other normally open contacts which when closed will establish a signal circuit through said left turn indicating lamp, a flasher means in said signal circuit for intermittently interrupting the current to either of said lamps, and a signal control circuit including a source of current supply, a right directional relay means which, when energized, will close the first named contacts, a left directional relay means which, when energized, will close the second named contacts, a three way closable control switch which is operable for selectively closing the signal control circuit to energize either the right or left directional relay means or to close a circuit through both of said relay means so that the potential on each of said relay means is equal, and lock-in means which will permit current to continue to flow to either the right or left directional relay means when one of the latter is energized and which will open the signal control circuit when the potential on each of said relay means is equal.

2. A directional signal system for vehicles comprising right and left turn indicating signal lamps, a source of current supply for each of said signal lamps, normally open contacts which when closed, will establish a signal circuit through said right turn indicating signal lamp, other normally open contacts which, when closed, will establish a signal circuit through said left turn indicating lamp, a flasher means in said signal circuit for intermittently interrupting the current to either of said lamps, and a signal control circuit including a source of current supply, a right directional relay means which, when energized, will close the first named contacts, a left directional relay means which, when energized, will close the second named contacts, a three way closable control switch which is operable for selectively closing the signal control circuit to energize either the right or left directional relay means or to close a circuit through both of said relay means so that the potential on each of said relay means is equal, lock-in means which will permit current to continue to flow to either the right or left directional relay means when one of the latter is energized and which will open the signal control circuit when the potential on each of said relay means is equal, and a centrifugal switch means automatically operable by centrifugal force when the vehicle makes a turn to open said control circuit.

3. A directional signal system for a vehicle comprising a turn indicating signal lamp adapted for use as a stop signal lamp, a source of current supply for said signal lamp, a flasher means for intermittently interrupting current to said lamp, normally open contacts which, when closed, will establish a circuit through said source of current supply, signal lamp and flasher means, a manually operated switch for establising a circuit through said source of current supply and signal lamp, said last named circuit including normally closed contacts which, when open, will interrupt flow of current through the last named circuit permitting the rear turn indicating signal lamp to be used to signal a turn when said manually operated switch is closed, and a turn signal control circuit including a source of current supply, relay means which, when energized, will close said normally open contacts and will open said normally closed contacts, a control switch for closing said signal control circuit, and a canceling switch operable on turning of the vehicle to interrupt flow of current to the energized relay means.

4. A directional signal system for vehicles comprising a front turn indicating signal lamp, a rear turn indicating signal lamp adapted for use as a stop signal lamp, a source of current supply for said signal lamps, a flasher means for intermittently interrupting current to said lamps, normally open contacts which, when closed, will establish a circuit through said source of current supply, signal lamps and flasher means, a manually operated switch for establishing a circuit through said source of current supply and said rear turn indicating signal lamp, said last named circuit including normally closed contacts which, when open, will interrupt flow of current through the last named circuit, and a turn signal control circuit including a source of current supply, relay means which, when energized, will close said normally open contacts and will open said normally closed contacts, and a control switch for closing said signal control circuit.

5. A directional signal system for vehicles comprising front right and left turn indicating signal lamps, rear right and left turn indicating signal lamps adapted for use as stop signal lamps, a source of current supply for said signal lamps, a flasher means for intermittently interrupting current to said lamps, normally open contacts which, when closed, will establish a circuit through said source of current supply, right signal lamps and flasher means, other normally open contacts which, when closed, will establish a circuit through said source of current supply, left signal lamps and flasher means, a manually operated switch for establishing circuits through each of said rear lamps and said source of current supply, said last named circuits each including normally closed contacts which, when open, will interrupt flow of current through their respective circuits, and a turn signal control circuit including a source of current supply, right and left directional relay means which, when energized, will close respectively the first or second named normally open contacts and will open respectively the normally closed contacts of the circuits through the right or left stop signal lamps, and a control switch for closing said turn control circuit.

GIDEON A. DU ROCHER.

References Cited in the file of this patent

UNITED STATES PATENTS

| Number | Name | Date |
|---|---|---|
| 1,973,299 | Swartwout | Sept. 11, 1934 |
| 2,108,454 | Steinman | Feb. 14, 1936 |
| 2,122,508 | Bell | July 5, 1938 |
| 2,268,545 | Crider | Jan. 6, 1942 |
| 2,432,388 | Curtiss | Dec. 9, 1947 |
| 2,456,242 | Bailey | Dec. 14, 1948 |